(12) United States Patent
Feng et al.

(10) Patent No.: US 12,546,398 B2
(45) Date of Patent: Feb. 10, 2026

(54) REVERSIBLE ELECTROMAGNETIC VALVE (71) Applicant: ZHEJIANG DUNAN ARTIFICIAL ENVIRONMENT CO., LTD., Shaoxing (CN)

(72) Inventors: Zhongbo Feng, Shaoxing (CN); Yunjun Xiong, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 0 days.

(21) Appl. No.: 18/512,062

(22) Filed: Nov. 17, 2023

(65) Prior Publication Data
US 2024/0093788 A1 Mar. 21, 2024

Related U.S. Application Data (63) Continuation of application No. PCT/CN2022/093884, filed on May 19, 2022.

(30) Foreign Application Priority Data

May 20, 2021 (CN) .......................... 202110553722.X (51) Int. Cl.
F16K 3/314 (2006.01)
F16K 3/02 (2006.01)
(Continued)

(52) U.S. Cl.
CPC ............ *F16K 3/314* (2013.01); *F16K 3/0254* (2013.01); *F16K 3/18* (2013.01); *F16K 31/122* (2013.01)

(58) Field of Classification Search
CPC ...... F16K 3/314; F16K 3/0254; F16K 31/122; F16K 3/029; F16K 3/18; F16K 3/24; F16K 3/243
(Continued)

(56) References Cited

U.S. PATENT DOCUMENTS 811,212 A * 1/1906 Giddings ................ E02B 13/02
251/147
3,113,757 A * 12/1963 Nixon ................. F16K 31/0668
251/327
(Continued)

FOREIGN PATENT DOCUMENTS

CN 2644802 Y 9/2004
CN 1952453 A 4/2007
(Continued)

OTHER PUBLICATIONS

International Search Report of PCT/CN2022/093884.
(Continued)

*Primary Examiner* — John Bastianelli (57) ABSTRACT

A reversible electromagnetic valve is provided, which includes a valve seat having a valve port, a slider slidably connected to the valve seat, and a driving member. The driving member can drive the slider to move in contact with the valve seat to use a sealing surface of the slider to selectively block the valve port. The sealing surface of the slider has a sealing point; the sealing point is provided corresponding to a limit position of an edge of the valve port of the valve seat, such that when the slider drives the sealing point to cross the valve port, the sealing surface of the slider can block the valve port; and under action of a pressure difference, a position where the sealing point of the slider is located is not lower than a plane where the edge of the valve port is located.

14 Claims, 9 Drawing Sheets (51) Int. Cl.
*F16K 3/18* (2006.01)
*F16K 31/122* (2006.01)

(58) Field of Classification Search
USPC .................. 251/129.01–129.22, 326–329
See application file for complete search history.

(56) References Cited

U.S. PATENT DOCUMENTS

| | | | | |
|---|---|---|---|---|
| 3,306,321 | A * | 2/1967 | Bastle | F16K 31/0617 137/625.48 |
| 3,463,193 | A * | 8/1969 | Yost | F16K 27/044 251/327 |
| 4,875,504 | A * | 10/1989 | Nicholson | F16K 31/046 251/291 |
| 5,020,774 | A | 6/1991 | Christianson | |
| 6,357,721 | B1 * | 3/2002 | Maurer | F16K 3/0218 251/360 |
| 7,600,739 | B2 * | 10/2009 | Phillips | F16K 31/05 251/266 |
| 2007/0069171 | A1 * | 3/2007 | Leadley | G02B 5/005 251/129.12 |
| 2014/0103238 | A1 | 4/2014 | Lv et al. | |

FOREIGN PATENT DOCUMENTS

| | | |
|---|---|---|
| CN | 201007369 Y | 1/2008 |
| CN | 102287548 A | 12/2011 |
| CN | 104344017 A | 2/2015 |
| CN | 106286892 A | 1/2017 |
| CN | 106286895 A | 1/2017 |
| CN | 207316134 U | 5/2018 |
| CN | 208886015 U | 5/2019 |
| FR | 1196093 A | 11/1959 |
| JP | 200778119 A | 3/2007 |
| JP | 2007085494 A | 4/2007 |
| JP | 2015110993 A | 6/2015 |

OTHER PUBLICATIONS

European search report of EP22804039.0 Oct. 16, 2024.
First notice of examination opinions of CN202110553722.X Dec. 18, 2024.
Second Notice of Reasons for Refusal of JP2023564123A Feb. 2025.

* cited by examiner

REVERSIBLE ELECTROMAGNETIC VALVE

CROSS-REFERENCE TO RELATED APPLICATIONS

This application is a continuation of international patent application No. PCT/CN2022/093884, filed on May 19, 2022, which itself claims priority to Chinese patent application No. 202110553722.X, filed on May 20, 2021, titled "REVERSIBLE ELECTROMAGNETIC VALVE". The content of the above applications is hereby incorporated by reference.

TECHNICAL FIELD

The present disclosure generally relates to the field of a bidirectional electromagnetic valve, and in particular, to a reversible electromagnetic valve.

BACKGROUND

Figure 1:
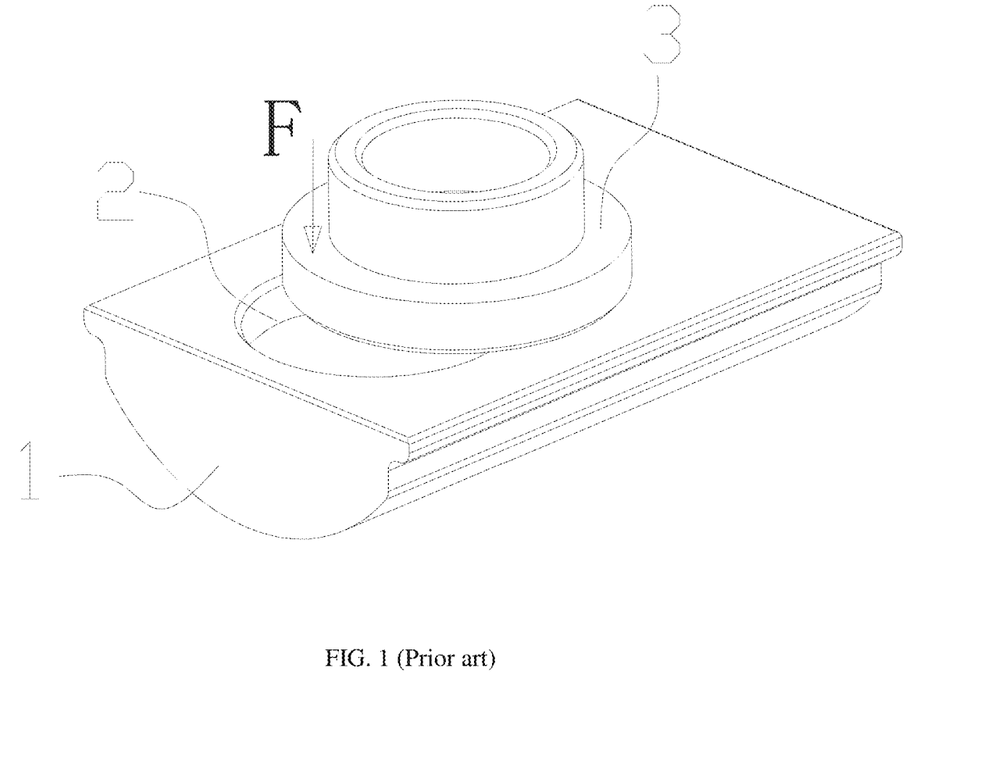
FIG. 1 is a schematic diagram of an assembly structure of a slider and a valve seat in a reversible electromagnetic valve in the related art.
Figure 2:
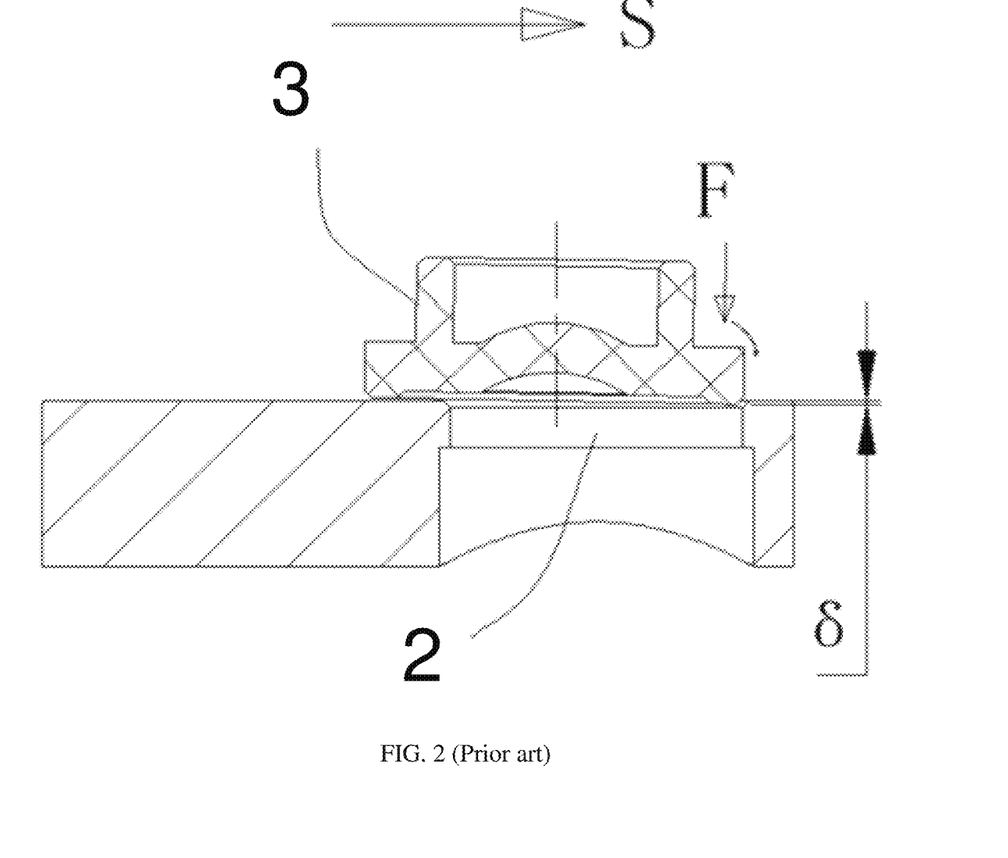
FIG. 2 is a schematic diagram of a tilted state of a slider in a reversible electromagnetic valve in the related art.

At present, a schematic diagram of an assembly structure of a valve seat and a slider in a reversible electromagnetic valve in the related art is shown in FIG. 1. A valve port 2 of the valve seat 1 is circular, and a slider 3 is used to seal a sealing surface of the valve port 2 and the slider 3 is set as a circular structure, so that when the slider 3 is moving on the valve seat 1 and closing the valve, the slider 3 crosses an opening edge of the valve port 2 of the valve seat 1 and two support points are formed, a force F would be generated on the slider under action of a pressure difference, and the force F would lead to rotation and tilting of the slider 3 along a line formed by the two support points. A structure diagram of the tilting that occurs after the rotation is shown in FIG. 2, the force F acts on the slider 3, and in a process of closing the valve port 2 along a valve closing direction S, a front end of the slider 3 along a direction of movement is plunged into the valve port 2, and a value of a depth with which the slider 3 is plunged into is denoted as δ, and the slider 3 is collided with the edge of the valve port 2 in a tilting state. After that, the slider 3 blocks the valve port 2 after the slider 3 is forced out of the valve port 2 by an external force. This will lead to a certain amount of interference between the slider 3 and the edge of the valve port 2 of the valve seat 1 in the process of closing the valve. When closing the reversible electromagnetic valve, a certain amount of contact exists between a sealing surface of the slider 3 and the edge of the valve port 2 of the valve seat 1, which in the long run will result in abrasion of the sealing surface of the slider 3, thus making it impossible for the sealing surface of the slider 3 to achieve an effective sealing on the valve port 2 of the valve seat 1, and reducing reliability of this reversible electromagnetic valve product.

SUMMARY

According to various embodiments of the present disclosure, a reversible electromagnetic valve is provided.

The reversible electromagnetic valve includes a valve seat having a valve port, a slider slidably connected to the valve seat, and a driving member; the driving member is capable of driving the slider to move in contact with the valve seat, resulting in a sealing surface of the slider configured to selectively block the valve port; the sealing surface of the slider has a sealing point, the sealing point of the sealing surface is provided corresponding to a limit position of an edge of the valve port of the valve seat, such that when the slider drives the sealing point to cross the valve port, the sealing surface of the slider is capable of blocking the valve port; and under action of a pressure difference, a position where the sealing point of the sealing surface is located is not lower than a plane where the edge of the valve port is located.

In an embodiment, the sealing point is provided on a border line of the sealing surface towards a side of the edge of the valve port.

In an embodiment, the border line of the sealing surface having the sealing point is provided as a straight segment perpendicular to a direction of movement of the slider on the valve seat.

In an embodiment, the sealing surface is in a shape of rectangular.

In an embodiment, the sealing surface is provided with an arcuate groove towards the side of the edge of the valve port, and the sealing point is located at a bottom of the arcuate groove.

In an embodiment, the sealing surface is provided with two arcuate grooves connected with each other, the two arcuate grooves are symmetrically disposed with respect to a center line of the slider, and a connecting node of the two arcuate grooves is defined as the sealing point.

In an embodiment, two support points on the slider where the sealing surface crosses the edge of the valve port are provided in the same straight line with the sealing point.

In an embodiment, the sealing surface is provided with one arcuate groove, the arcuate groove is symmetrical with respect to a center line of the slider, and a center point of the bottom of the arcuate groove is defined as the sealing point.

In an embodiment, the sealing point of the slider is located at inside of a connecting line of two support points where the sealing surface crosses the edge of the valve port.

In an embodiment, the sealing point is provided inside the sealing surface.

In an embodiment, the sealing surface includes a circular main surface and a bar-shaped convex surface disposed on the circular main surface, the sealing point is located at a center of a line joining the circular main surface and the bar-shaped convex surface.

In an embodiment, a sum of two times a sealing width when the sealing surface blocks the valve port and a size of the valve port is less than a maximum size of the sealing surface, and the sealing width is the shortest perpendicular distance between the sealing point and the edge of the valve port.

In an embodiment, the sealing surface is an end surface of the slider in contact with the valve seat.

In an embodiment, the reversible electromagnetic valve further includes a valve body and a valve core assembly; the valve core assembly includes the slider and a piston, and the valve body has a valve cavity in which the valve core assembly is capable of moving; an intermediate end cap is provided in the valve cavity, a first end cap and a second end cap are provided at two ends of the valve body, respectively; the valve cavity includes a first chamber, a second chamber, and a third chamber; the first chamber is defined by the first end cap, the valve body, and the valve core assembly; the second chamber is defined by the valve core assembly, the intermediate end cap, and the valve body; and the third chamber is defined by the valve core assembly, the valve body, and the second end cap.

In an embodiment, the valve body is provided with a first hole and a second hole, the first hole is in communication with the second chamber, the second hole is in communication with the third chamber, a first capillary pipe is provided in the first hole, a second capillary pipe is provided in the second hole, and the first capillary pipe and the second capillary pipe are connected to the driving member, so as to form a pressure difference between two sides of the valve core assembly to push the valve core assembly to move.

Details of one or more embodiments of the present disclosure are set forth in the following accompanying drawings and description. Other features, objects, and advantages of the present disclosure will become apparent from the specification, the accompanying drawings, and the claims.

BRIEF DESCRIPTION OF THE DRAWINGS

Reference may be made to one or more of the accompanying drawings for a purpose of better describing and illustrating the embodiments and/or examples of those applications disclosed herein. Additional details or examples used to describe the accompanying drawings should not be considered a limitation on the scope of any of the disclosed applications, the embodiments and/or examples presently described, and the best mode of these applications as presently understood.

The labels in the figures indicate the following meanings: 100 represents a reversible electromagnetic valve, 10 represents a valve seat, 11 represents a valve port, 12 represents an edge of the valve port, 13 represents a support point, 20 represents a slider, 201 represents a circular main surface, 21 represents a sealing point, 210 represents an arcuate groove, 22 represents a sealing surface, 23 represents a border line, 30 represents a driving member, 40 represents a valve body, 41 represents a valve cavity, 411 represents a first chamber, 412 represents a second chamber, 413 represents a third chamber, 42 represents a first end cap, 43 represents a second end cap, 44 represents an intermediate end cap, 45 represents a first hole, 451 represents a first capillary pipe, 46 represents a second hole, 461 represents a second capillary pipe, 50 represents a valve cover assembly, and 51 represents a piston.

DETAILED DESCRIPTION OF THE EMBODIMENT

The technical solutions in the embodiments of the present disclosure are clearly and completely described in the following with reference to the accompanying drawings in the embodiments of the present disclosure. It is obvious that the described embodiments are only a part of the embodiments, but not all of the embodiments. All other embodiments obtained by those skilled in the art based on the embodiments of the present disclosure without making creative labor are the scope of the present disclosure.

Unless otherwise defined, all technical and scientific terms used herein have the same meaning as a skilled person in the art would understand. The terminology used in the description of the present disclosure is for the purpose of describing particular embodiments and is not intended to limit the disclosure.

Figure 3:
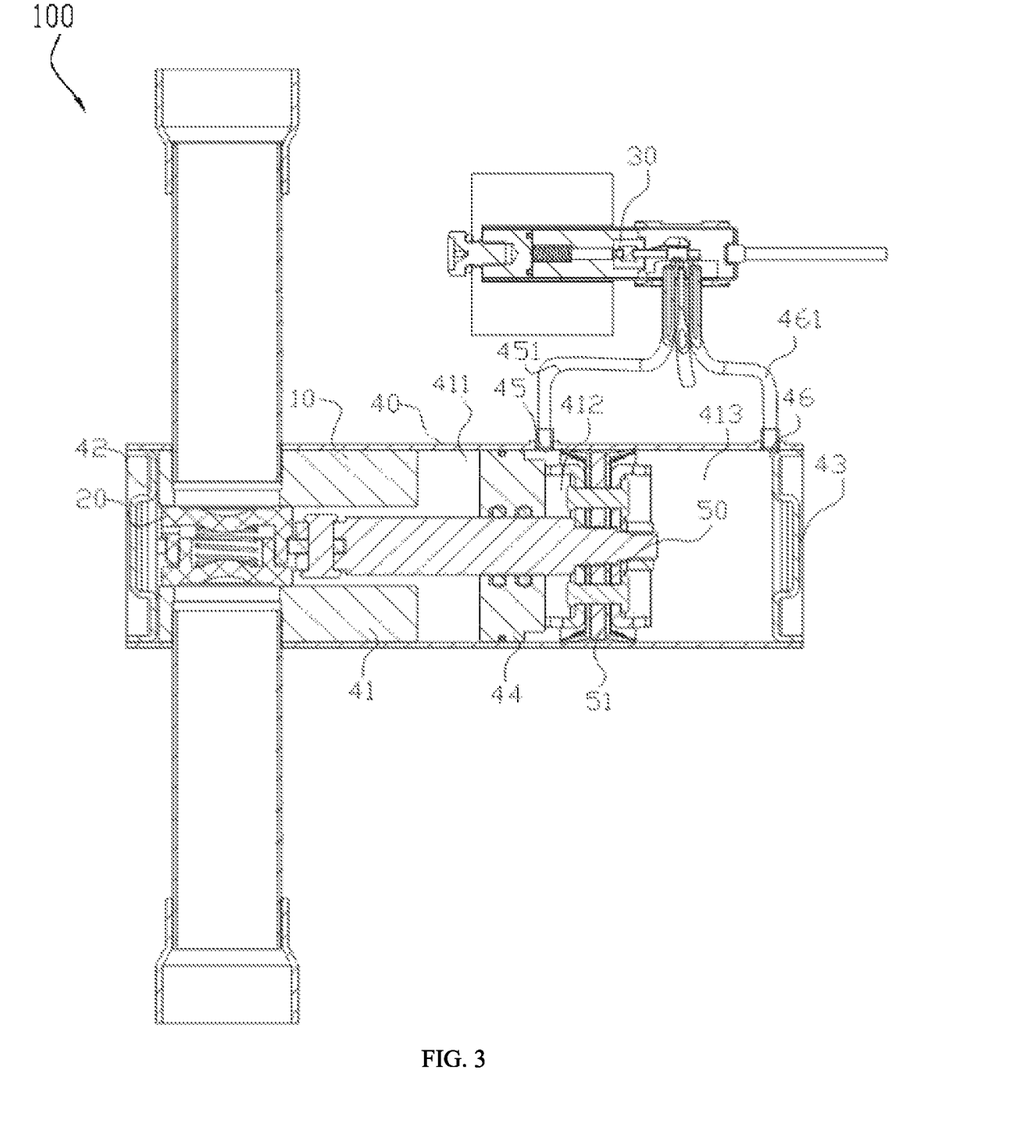
FIG. 3 is a schematic diagram of a reversible electromagnetic valve in an embodiment of the present disclosure.

Referring to FIG. 3, the present disclosure provides a reversible electromagnetic valve 100, including a valve body 40, a valve core assembly 50, and a driving member 30. The valve body 40 has a valve cavity 41, and the valve core assembly 50 is capable of moving in the valve cavity 41. An intermediate end cap 44 is provided in the valve cavity 41, and a first end cap 42 and a second end cap 43 are provided at two ends of the valve body 40, respectively. The valve cavity 41 includes a first chamber 411, a second chamber 412, and a third chamber 413. The first chamber 411 is defined by the first end cap 42, the valve body 40, and the valve core assembly 50; the second chamber 412 is defined by the valve core assembly 50, the intermediate end cap 44, and the valve body 40; and the third chamber 413 is defined by the valve core assembly 50, the valve body 40, and the second end cap 43.

The valve body 40 is provided with a first hole 45 and a second hole 46, the first hole 45 is in communication with the second chamber 412, and the second hole 46 is in communication with the third chamber 413. A first capillary pipe 451 is provided in the first hole 45, a second capillary pipe 461 is provided in the second hole 46, and the first capillary pipe 451 and the second capillary pipe 461 are connected to the driving member 30, so as to form a pressure difference between two sides of the valve core assembly 50 to push the valve core assembly 50 to move.

The valve core assembly 50 includes a slider 20 and a piston 51, the slider 20 is located in the first chamber 411, and the second chamber 412 and the third chamber 413 are sealingly isolated by the piston 51. The second chamber 412 is located at a side of the piston 51 proximal to the first chamber 411, the third chamber 413 is located at a side of the piston 51 proximal to the second end cap 43, the pressure difference between the second chamber 412 and the third chamber 413 is formed to push the piston 51 to move.

Referring to FIG. 3, the reversible electromagnetic valve 100 includes a valve seat 10 having a valve port 11 and the driving member 30, and the valve core assembly 50 includes the slider 20. The valve seat 10 is disposed in the valve body 40, the driving member 30 is disposed outside the valve body 40, the slider 20 is connected to the piston 51, and the slider 20 is driven by the piston 51 to move in the valve seat 10.

The driving member 30 is capable of driving the slider 20 to move in contact with the valve seat 10, resulting in a sealing surface 22 of the slider 20 configured to selectively block the valve port 11, so as to achieve opening and closing control of the valve port 11 of the valve seat 10 when the reversible electromagnetic valve 100 operates. It should be noted that the sealing surface 22 of the slider 20 in the present disclosure refers to an end surface of the slider 20 in contact with the valve seat 10.

Referring to FIG. 1 to FIG. 6, in the present disclosure, the sealing surface 22 of the slider 22 has a sealing point 21, the sealing point 21 of the sealing surface 22 is provided corresponding to a limit position of an edge 12 of the valve port of the valve seat 10, such that when the slider 20 drives the sealing point 21 to cross the valve port 11, the sealing surface 22 of the slider 20 is capable of blocking the valve port 11; and under action of a pressure difference, a position where the sealing point 21 of the slider 20 is located is not lower than a plane where the edge 12 of the valve port is located. In the above reasonable structure, when driving the slider 20 to close the valve, the reversible electromagnetic valve 100 may prevent a position where the sealing point 21 of the slider 20 is located from being interfered with the edge 12 of the valve port of the valve seat 10, avoid contact between the position where the sealing point 21 of the slider 20 is located and the edge 12 of the valve port, ensure sealing effect for the valve port when the sealing surface 22 of the slider 20 blocks the valve port 11 of the valve seat 10, and have a function to enhance reliability of the reversible electromagnetic valve 100.

It could be understood that in the present disclosure, when the reversible electromagnetic valve 100 drives the sealing surface 22 of the slider 20 to block the valve port 11 of the valve seat 10, the slider 20 may continue to move a certain distance to stop after driving the sealing surface 22 to block the valve port 11 exactly. In other words, in the present embodiment, when the reversible electromagnetic valve 100 blocks the valve port 11 of the valve seat 10 by the slider 20, the shortest perpendicular distance between the sealing point 21 of the sealing surface 22 of the slider 20 and the edge 12 of the valve port is a sealing width denoted as D of the slider 20. Therefore, the sealing point 21 of the slider 20 may be set corresponding to the limit position of the edge 12 of the valve port of the valve seat 10, and the limit position includes two situations: in a first situation, when the slider 20 is located at a critical position for blocking the valve port 11, the sealing point 21 of the slider 20 is a position corresponding to the last blocked part of the edge 12 of the valve port of the valve seat 10; and in a second situation, when the slider 20 finally comes to a stop, the sealing point 21 of the slider 20 is a position corresponding to the last blocked part of the edge 12 of valve port of the valve seat 10.

Referring to FIG. 4 to FIG. 9, the sealing point 21 belongs to the first situation. Specifically, the sealing point 21 of the slider 20 may be provided on a border line 23 on the sealing surface 22 towards a side of the edge 12 of the valve port. Since the slider 20 can only rotate and tilt around a connecting line under action of a pressure difference, and the connecting line is connected between two support points 13 which are formed by the border line 23 of the sealing surface 22 of the slider 20 crossing the edge 12 of the valve port, the sealing point 21 may be provided on the border line 23 to ensure that the sealing point 21 of the slider 20 is always on a plane where the edge 12 of the valve port of the valve seat is located, i.e., the sealing point 21 of the slider 20 will not be plunged into the valve port 11 due to rotation of the slider 20. This may avoid interference between the position where the sealing point 21 of the slider 20 is located and the edge 12 of the valve port of the valve seat 10, so as to ensure sealing effect for the valve port 11 of the valve seat 10 when the slider 20 closes the valve.

Figure 4:
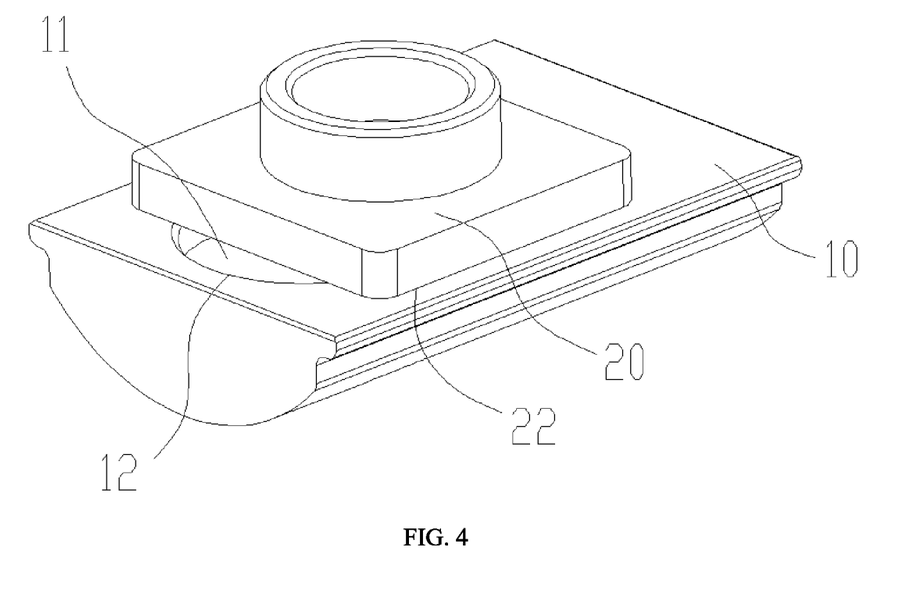
FIG. 4 is a schematic diagram of an assembly structure of a valve seat and a slider in a reversible electromagnetic valve in an embodiment of the present disclosure.
Figure 5:
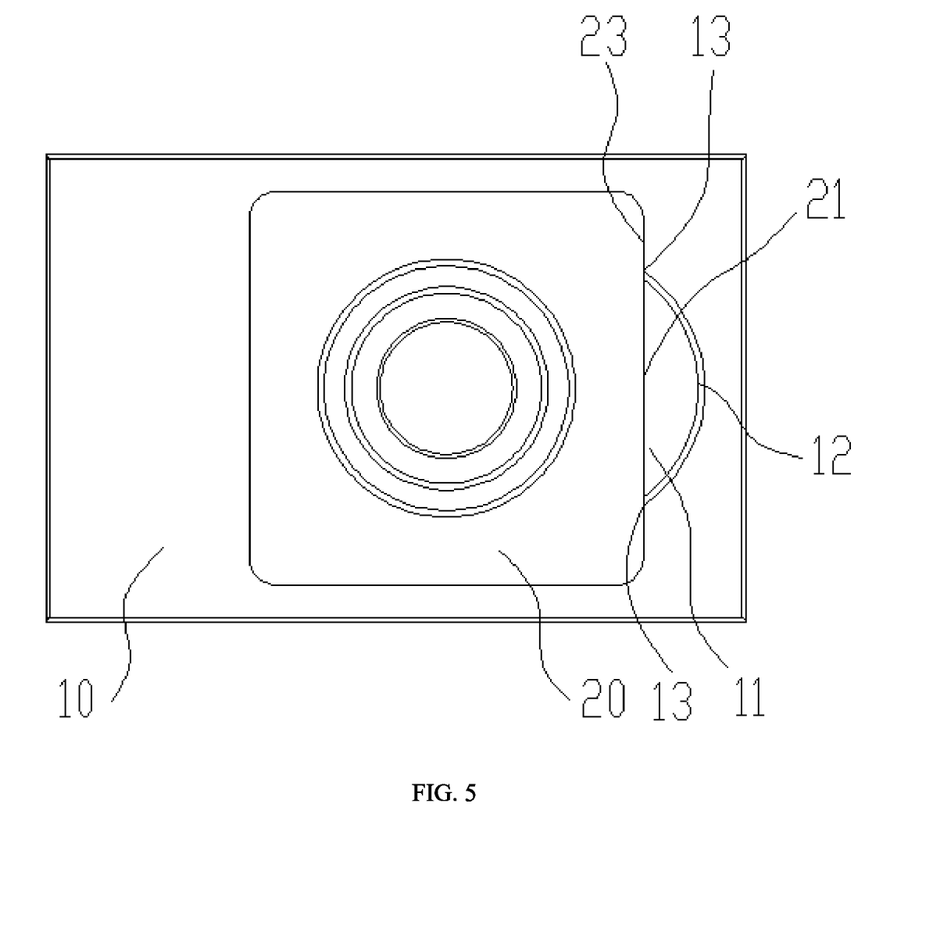
FIG. 5 is a schematic diagram of an assembly structure of a valve seat and a slider in a reversible electromagnetic valve with another view in an embodiment of the present disclosure.
Figure 6:
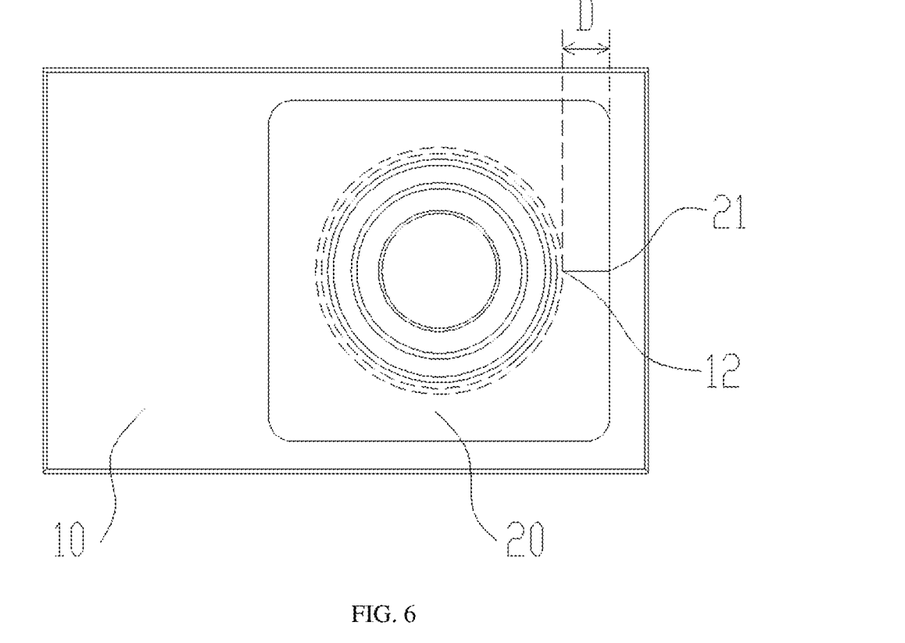
FIG. 6 is a schematic diagram of an assembly structure of a valve seat and a slider in a reversible electromagnetic valve in a second situation in an embodiment of the present disclosure.

Referring to FIG. 4 to FIG. 6, in a reversible electromagnetic valve 100 provided in a first embodiment of the present disclosure, the border line 23 on the sealing surface 22 having the sealing point 21 may be provided as a straight segment perpendicular to a direction of movement of the slider 20 on the valve seat 10. The border line 23 of the slider 20 having the sealing point 21 may have a function of simplifying a structure of the sealing surface 22 of the slider 20 to facilitate production of the slider 20 and to reduce production cost of the slider 20. Specifically, the sealing surface 22 of the slider 20 may be in a shape of rectangular, to further simplify the structure of the slider. It should be noted that the sealing surface 22 of the slider 20 is not limited to what is shown in the figures. For one skilled in the art, the border line 23 of the slider 20 having the sealing point 21 may be in any other shape, as long as the two support points 13 where the border line 23 crosses the edge 12 of the valve port are provided in the same straight line with the sealing point 21, and the valve port 11 can be blocked when the sealing surface 22 of the slider 20 is on the valve port 11 of the valve seat 10.

Figure 7:
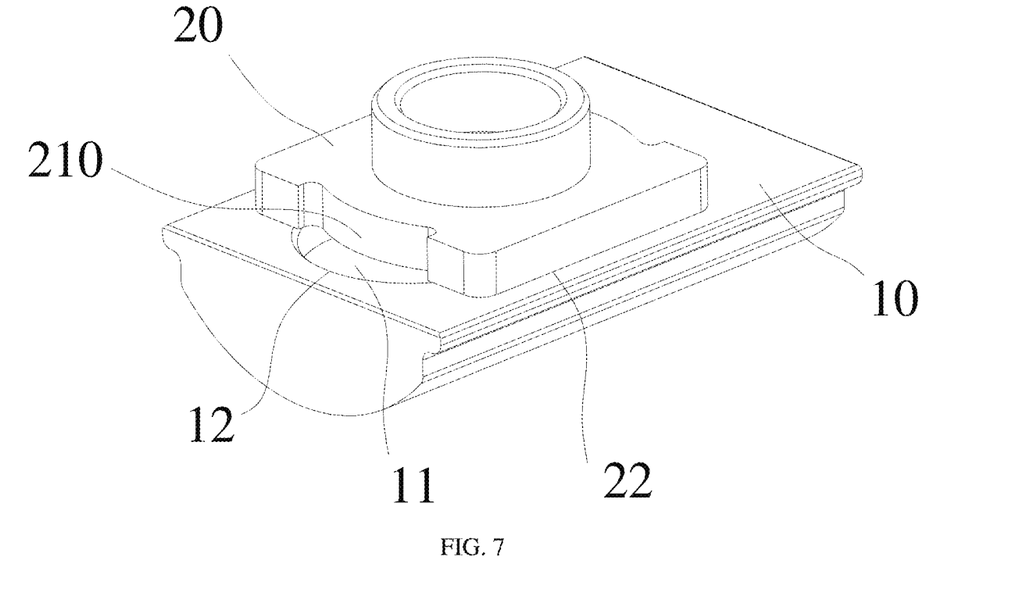
FIG. 7 is a schematic diagram of an assembly structure of a valve seat and a slider in a reversible electromagnetic valve in an embodiment of the present disclosure.
Figure 8:
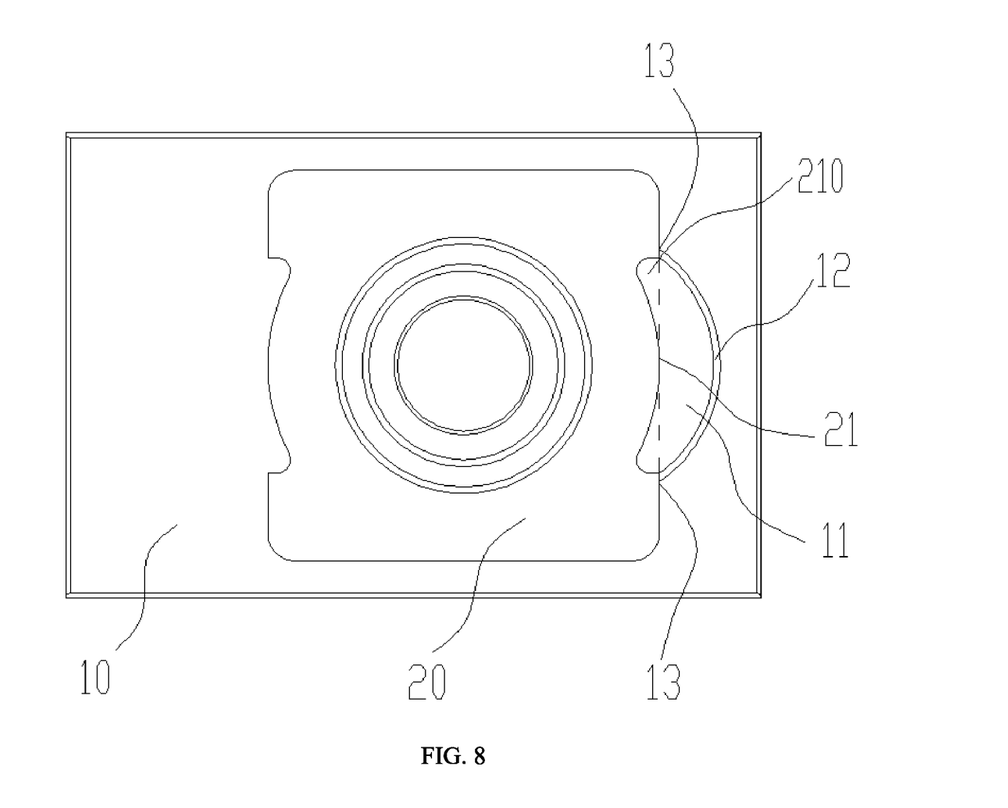
FIG. 8 is a schematic diagram of an assembly structure of a valve seat and a slider in a reversible electromagnetic valve with another view in an embodiment of the present disclosure.

Referring to FIG. 7 and FIG. 8, in a reversible electromagnetic valve 100 provided in a second embodiment of the present disclosure, the sealing surface 22 of the slider 20 may be provided with an arcuate groove 210 towards the side of the edge 12 of the valve port, and the sealing point 21 may be located at a bottom of the arcuate groove. In the above structure, the sealing surface 22 of the slider 20 configured to seal the valve port 11 may be in other structure, so as to realize diversity of a structure of the slider 20, so that the slider 20 may be set according to different requirements. The sealing surface 22 may be provided with two arcuate grooves connected with each other, the two arcuate grooves may be symmetrically disposed with respect to a center line of the slider 20, and a connecting node of the two arcuate grooves may be located as the sealing point 21 of the slider 20. The two support points 13 where the sealing surface 22 crosses the edge 12 of the valve port are provided in the same straight line with the sealing point 21, and the diversity of structure of the slider 20 may be realized on the basis of ensuring that the sealing point 21 of the slider 20 is always provided in the plane where the edge 12 of the valve port on the valve seat 10 is located. It should be noted that the arcuate groove is not limited to what is shown in the figures. For one skilled in the art, the arcuate groove may be in any other shapes, as long as the two support points 13 where the sealing surface crosses the edge 12 of the valve port are provided in the same straight line with the sealing point 21, and the sealing point 21 is always provided on the border line 23 of the sealing surface 22 of the slider 20, which is not elaborated herein.

Figure 9:
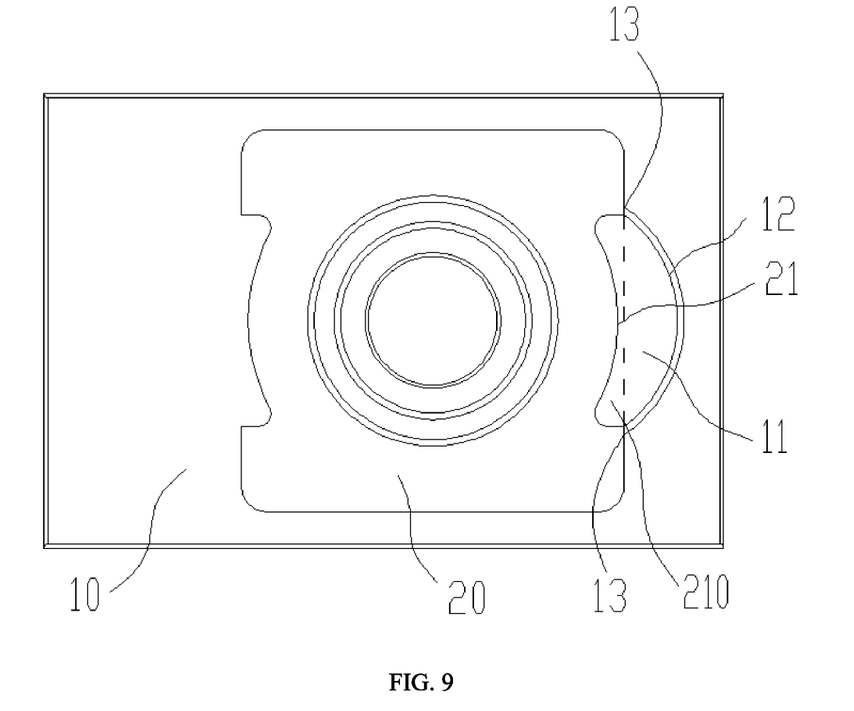
FIG. 9 is a schematic diagram of an assembly structure of a valve seat and a slider in a reversible electromagnetic valve in an embodiment of the present disclosure.

Referring to FIG. 9, in a reversible electromagnetic valve 100 provided in a third embodiment of the present disclosure, a structure of the slider 20 is generally similar to that of the slider 20 in the second embodiment of the second embodiment, the sealing surface 22 of the slider 20 in the present embodiment may also be provided with an arcuate groove 210 on an end of the sealing surface towards the side of the edge 12 of the valve port, the arcuate groove 210 may be symmetrical with respect to a center line of the slider 20, and a center point of the bottom of the arcuate groove 210 may be defined as the sealing point 21. When the slider 20 closes the valve, the sealing point 21 of the slider 20 may be located at inside of the connecting line of two support points 13 where the sealing surface 22 of the slider 20 crosses the edge 12 of the valve port. When the slider 20 rotates and tilts around the connecting line between the two support points under action of a pressure difference, the sealing point 21 of the slider 20 may be higher than the plane where the edge 12 of the valve port is located. This may avoid interference between the position where the sealing point 21 of the slider 20 is located and the edge 12 of the valve port of the valve seat 10, so as to ensure sealing effect for the valve port 11 of the valve seat 10 when the slider 20 closes the valve. It should be noted that a structure of the arcuate groove 210 of the slider 20 is not limited to what is shown in the figures. For one skilled in the art, on the basic of the above conditions, the arcuate groove 210 may be in other shapes, which are not elaborated herein.

Figure 10:
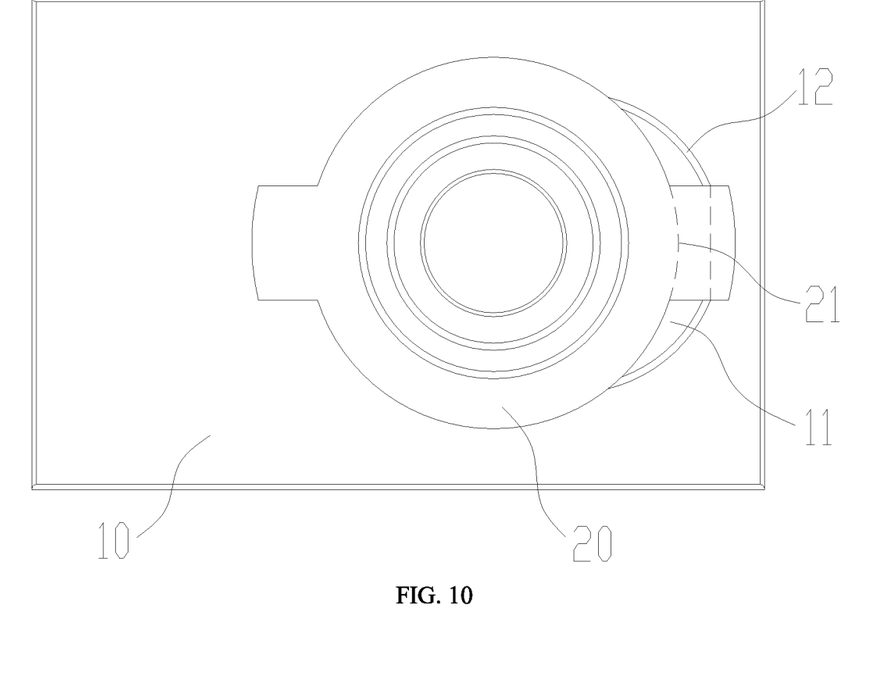
FIG. 10 is a schematic diagram of an assembly structure of a valve seat and a slider in a reversible electromagnetic valve in an embodiment of the present disclosure.
Figure 11:
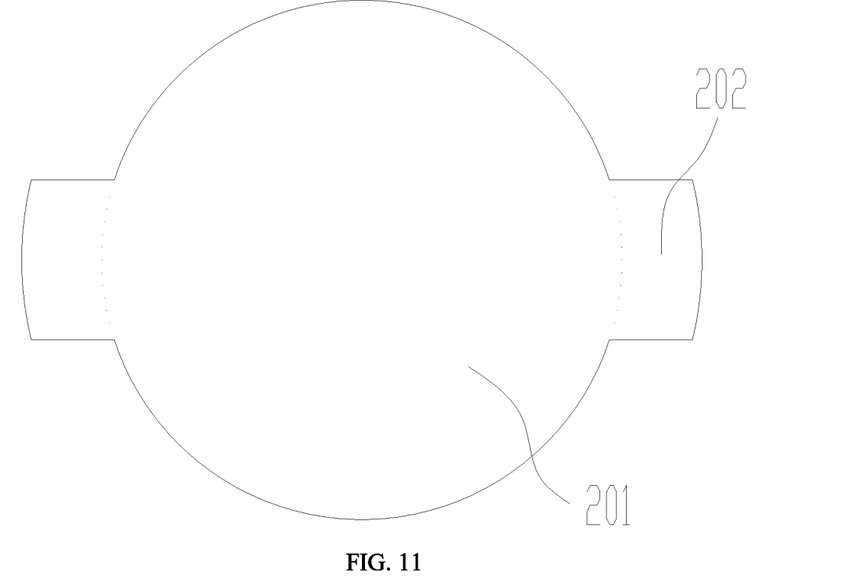
FIG. 11 is a schematic diagram of a sealing surface on a slider in a reversible electromagnetic valve in an embodiment of the present disclosure.
Figure 12:
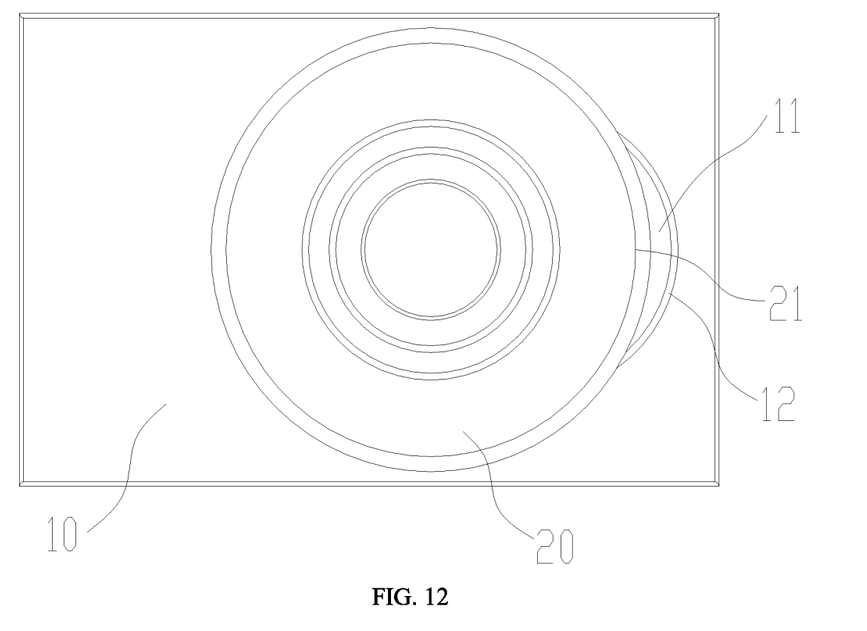
FIG. 12 is a schematic diagram of an assembly structure of a valve seat and a slider in a reversible electromagnetic valve in an embodiment of the present disclosure.

In addition, referring to FIG. 10 to FIG. 12, the sealing point belongs to the second situation. Except for the sealing point 21 provided on the border line 23 of the sealing surface 22, the sealing point 21 of the slider 20 may further be provided inside the sealing surface 22, so as to realize diversity of a structure of the sealing surface 22 of the slider 20, so that the slider 20 may be set according to different requirements. Referring to FIG. 10 and FIG. 11, in a reversible electromagnetic valve 100 provided in a fourth embodiment of the present disclosure, the sealing surface 22 of the slider 20 may include a circular main surface 201 and a bar-shaped convex surface 202 disposed on the circular main surface 201, the sealing point 21 may be located at a center of a line joining the circular main surface 201 and the bar-shaped convex surface 202. When the slider 20 blocks the valve port 11 of the valve seat 10, an outer edge of the bar-shaped convex surface 202 may first interfere with the edge 12 of the valve port. This may avoid interference between the position where the sealing point 21 of the slider 20 is located and the edge 12 of the valve port of the valve seat 10, so as to ensure sealing effect for the valve port 11 of the valve seat 10 when the slider 20 closes the valve. Referring to FIG. 12, in a reversible electromagnetic valve 100 provided in a fifth embodiment of the present disclosure, the slider 20 may be in a shape of disc, and the sealing point 21 may be located in the sealing surface 22 of the slider 20. A sum of two times a sealing width denoted as D when the sealing surface 22 blocks the valve port 11 and a size of the valve port 11 may be less than a maximum size of the sealing surface 22. The outer diameter of the sealing surface 22 is so great enough that the outer edge of the slider 20 first interferes with the edge 12 of the valve port. This may avoid interference between the position where the sealing point 21 of the slider 20 is located and the edge 12 of the valve port of the valve seat 10, so as to ensure sealing effect for the valve port 11 of the valve seat 10 when the slider 20 closes the valve.

It should be noted that the valve port of the valve seat 10 of the reversible electromagnetic valve 100 is usually a conventional circular structure. For some embodiments of the reversible electromagnetic valve 100, the valve port of the valve seat 10 may be provided as a polygon structure, which is not be elaborated here.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

What is claimed is:

1. A reversible electromagnetic valve, comprising a valve seat having a valve port, a slider slidably connected to the valve seat, and a driving member;
   wherein the driving member is capable of driving the slider to move in contact with the valve seat, resulting in a sealing surface of the slider configured to selectively block the valve port; and
   the sealing surface of the slider has a sealing point, the sealing point of the sealing surface is provided corresponding to a limit position of an edge of the valve port of the valve seat, such that when the slider drives the sealing point to cross the valve port, the sealing surface of the slider is capable of blocking the valve port; and under action of a pressure difference, a position where the sealing point of the sealing surface is located is not lower than a plane where the edge of the valve port is located;
   the reversible electromagnetic valve further comprises a valve body and a valve core assembly;
   the valve core assembly comprises the slider and a piston, and the valve body has a valve cavity in which the valve core assembly is capable of moving;
   an intermediate end cap is provided in the valve cavity, a first end cap and a second end cap are provided at two ends of the valve body, respectively; and the valve cavity comprises a first chamber, a second chamber, and a third chamber; and
   the first chamber is defined by the first end cap, the valve body, and the valve core assembly; the second chamber is defined by the valve core assembly, the intermediate end cap, and the valve body; and the third chamber is defined by the valve core assembly, the valve body, and the second end cap.

2. The reversible electromagnetic valve of claim 1, wherein the sealing point is provided on a border line of the sealing surface towards a side of the edge of the valve port.

3. The reversible electromagnetic valve of claim 2, wherein the border line of the sealing surface having the sealing point is provided as a straight segment perpendicular to a direction of movement of the slider on the valve seat.

4. The reversible electromagnetic valve of claim 3, wherein the sealing surface is in a shape of rectangular.

5. The reversible electromagnetic valve of claim 4, wherein the sealing surface is provided with an arcuate groove towards the side of the edge of the valve port, and the sealing point is located at a bottom of the arcuate groove.

6. The reversible electromagnetic valve of claim 5, wherein the sealing surface is provided with two arcuate grooves connected with each other, the two arcuate grooves are symmetrically disposed with respect to a center line of the slider, and a connecting node of the two arcuate grooves is defined as the sealing point.

7. The reversible electromagnetic valve of claim 5, wherein two support points on the slider where the sealing surface crosses the edge of the valve port are provided in the same straight line with the sealing point.

8. The reversible electromagnetic valve of claim 5, wherein the sealing surface is provided with one arcuate groove, the arcuate groove is symmetrical with respect to a center line of the slider, and a center point of the bottom of the arcuate groove is defined as the sealing point.

9. The reversible electromagnetic valve of claim 8, wherein the sealing point of the slider is located at inside of a connecting line of two support points where the sealing surface crosses the edge of the valve port.

10. The reversible electromagnetic valve of claim 1, wherein the sealing point is provided inside the sealing surface.

11. The reversible electromagnetic valve of claim 10, wherein the sealing surface comprises a circular main surface and a bar-shaped convex surface disposed on the circular main surface, the sealing point is located at a center of a line joining the circular main surface and the bar-shaped convex surface.

12. The reversible electromagnetic valve of claim 10, wherein a sum of two times a sealing width when the sealing surface blocks the valve port and a size of the valve port is less than a maximum size of the sealing surface, wherein the sealing width is the shortest perpendicular distance between the sealing point and the edge of the valve port.

13. The reversible electromagnetic valve of claim 1, wherein the sealing surface is an end surface of the slider in contact with the valve seat.

14. The reversible electromagnetic valve of claim 1, wherein the valve body is provided with a first hole and a second hole, the first hole is in communication with the second chamber, the second hole is in communication with the third chamber, a first capillary pipe is provided in the first hole, a second capillary pipe is provided in the second hole, and the first capillary pipe and the second capillary pipe are connected to the driving member, so as to form a pressure difference between two sides of the valve core assembly to push the valve core assembly to move.

* * * * *